United States Patent [19]

De Forrest

[11] Patent Number: 4,570,355
[45] Date of Patent: Feb. 18, 1986

[54] APPARATUS AND PROCESS RELATED TO KEYING A LOCK WITH A CONTROL KEY

[76] Inventor: William De Forrest, 1825 Via Burton, Anaheim, Calif. 92806

[21] Appl. No.: 635,106

[22] Filed: Jul. 27, 1984

[51] Int. Cl.$^4$ ............................................... G01B 3/28
[52] U.S. Cl. .................................. 33/539; 33/169 B; 33/172 R; 33/178 D
[58] Field of Search ............. 33/169 B, 174 F, 178 D, 33/172 R, 539

[56] References Cited

U.S. PATENT DOCUMENTS

| | | | |
|---|---|---|---|
| 1,971,628 | 8/1934 | Sutterlin | 33/178 D |
| 3,113,386 | 12/1963 | Bolfar | 33/174 F |
| 3,848,339 | 11/1974 | Strasbaugh | 33/169 B |
| 3,903,609 | 9/1975 | Brown | 33/169 B |

*Primary Examiner*—Willis Little
*Attorney, Agent, or Firm*—K. H. Boswell

[57] ABSTRACT

For use in combination with a pin-tumbler lock cylinder of the type having a key plug nested within a control cylinder which in turn is nested within a main body cylinder and including a plurality of bores extending through the key plug, the control cylinder and the main body cylinder with a pin-tumbler located in each of the bores, a measuring device for determining the pin-tumbler size for preparing a control key includes a body having a cylinder mating face and a probe which extends from the cylinder mating face. The cylinder mating face is mated against the outside of the main body cylinder with the probe positioned within the bore. When the interface between the driver pin and the control pin is located at the shear line between the control cylinder and the main body cylinder, the length of the probe which is accepted within the bore is an indication of the cut necessary for preparing a control key for the lock.

13 Claims, 10 Drawing Figures

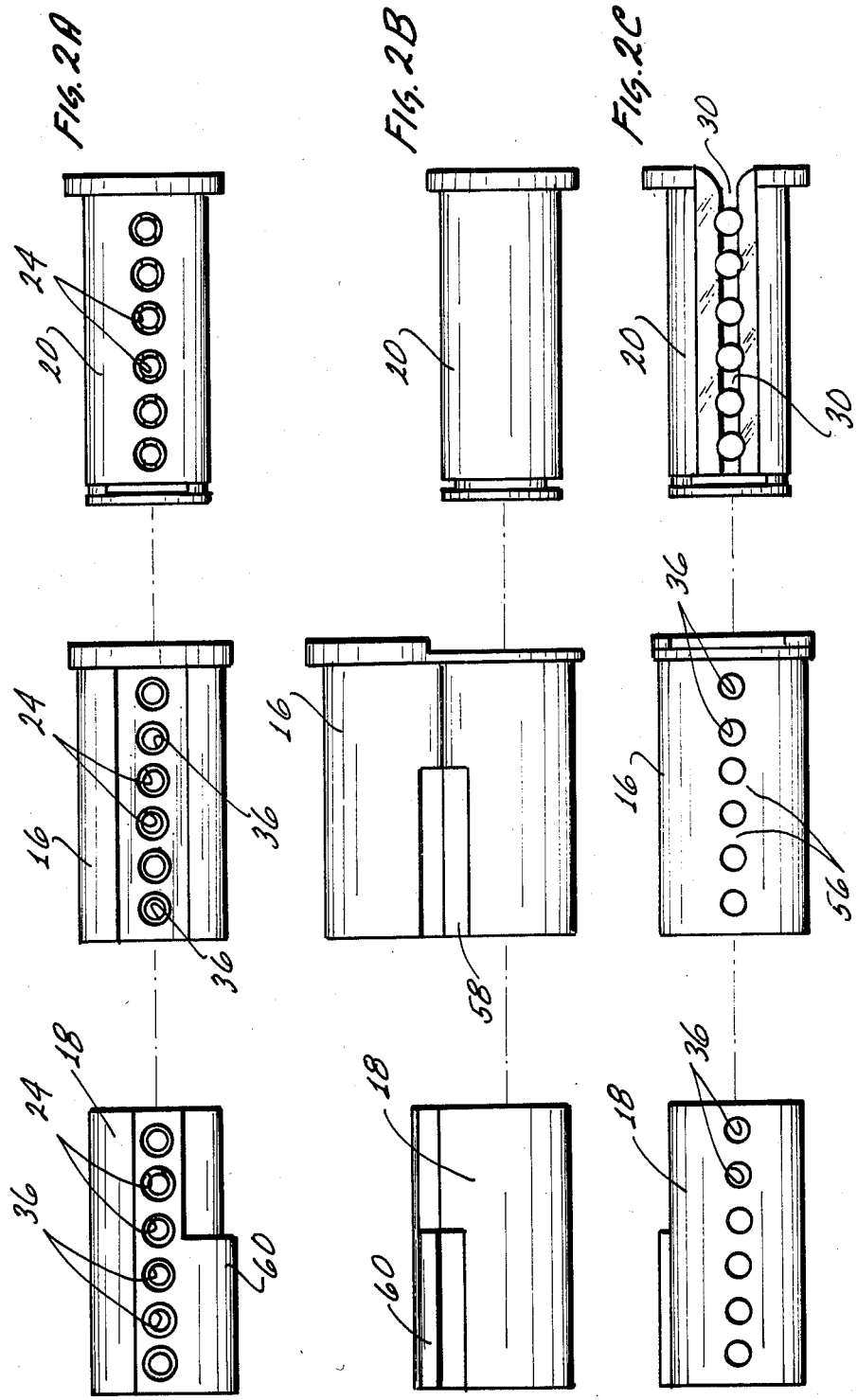

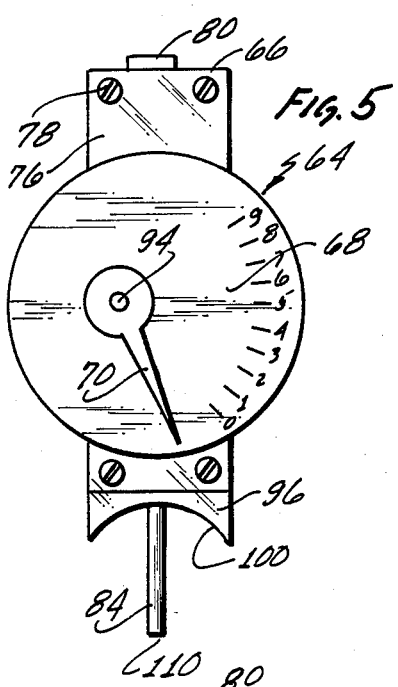
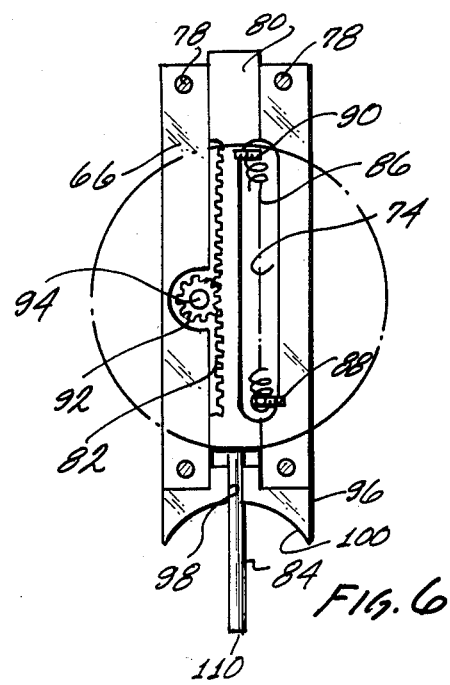
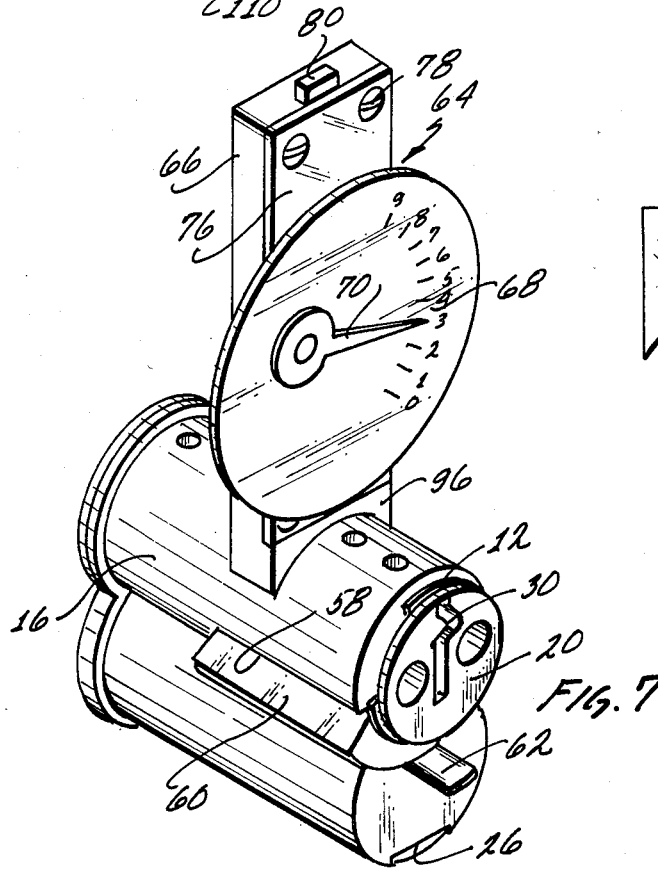
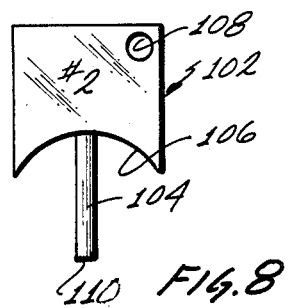

APPARATUS AND PROCESS RELATED TO KEYING A LOCK WITH A CONTROL KEY

BACKGROUND OF THE INVENTION

This invention is directed to a device and a process both of which are utilized in combination with a pin-tumbler lock cylinder of the type which includes a control cylinder for holding the pin-tumbler lock cylinder within a cylinder lock. The device and the process are utilized to determine the size of at least a portion of the pin-tumblers so as to enable convenient cutting of the cuts in a control key utilized for removing said pin-tumbler lock cylinder from the cylinder lock.

For use in large institutions such as hotels, hospitals, schools and the like, wherein it is often necessary to rekey locks at frequent intervals for security or other reasons, a type of cylinder lock has been developed which utilizes a pin-tumbler lock cylinder which is extracted from the main body of the lock utilizing a control key. The purpose behind the use of the control key is to allow for ease of withdrawal of the pin-tumbler lock cylinder to change the individual pins in the lock cylinder in order to rekey the lock.

If one is in possession of a control key, it is a simple matter to remove the pin-tumbler lock cylinder. This is simply done by inserting the control key, rotating it a few degrees to unlock the pin-tumbler lock cylinder from the lock body and then withdrawing the pin-tumbler lock cylinder. Once the appropriate pins have been changed in the pin-tumbler lock cylinder, the lock cylinder is reinserted into the body of the lock and the control key is utilized to lock the lock cylinder to the main body of the lock.

The pin-tumbler lock cylinders of the type described above have a main body cylinder which has a control cylinder nested within it. The control cylinder moves between an unlocked and a locked position with respect to the main body cylinder with a portion of the control cylinder being withdrawn into the main body cylinder in the unlocked position allowing for removal of the pin-tumbler lock cylinder and this same portion extending out of the main lock cylinder so as to lock the totality of the pin tumbler lock cylinder to the cylinder lock body to secure the pin-tumbler lock cylinder in the cylinder lock body. Nested within the control cylinder is a key plug. The key plug in a standard manner is connected to the bolt mechanism of the cylinder lock to lock or unlock the door or other structure to which the cylinder lock is attached.

The key plug rotates within the control cylinder to lock and unlock the cylinder lock as described above. A first shear line thus exists between the key plug and the control cylinder. The control cylinder in turn rotates within the main cylinder body to lock or unlock the pin-tumbler lock cylinder to the cylinder lock body. As such, a further shear line exists between the control cylinder and the main body cylinder.

When it becomes necessary to change the pins in all of the locks in a large structure such as a hotel or the like, it is evident that if one is in possession of the control key, it is extremely easy to remove each of the pin-tumbler lock cylinders, modify the same and then reinsert them into their respective cylinder lock bodies. The control keys, as such, are not in everyday use, but are only used on special occasions when it becomes necessary to rekey one or more locks. Because it is infrequently used and because of a variety of other reasons, too frequently the control key becomes lost or misplaced or otherwise unavailable when it is necessary to rekey one or more of the cylinder locks.

The presence of two shear lines in the above described pin-tumbler lock cylinders make this type of lock very difficult to pick. Even the most highly skilled master locksmith sometimes has a difficult time in picking these locks. It is obvious then, that on any occasion where one of these locks must be picked, upon successful picking of the lock and upon removal of the pin-tumbler lock cylinder, the first order of business is the preparation of a control key. Once a control key is cut, further pin-tumbler lock cylinders can be removed and/or the new control key can hopefully be stored in a safe place for future use.

The above described pin-tumbler lock cylinders generally use six individual pin-tumblers. Each of these is located in a separate pin bore. The individual pin-tumblers normally include no less than three separate pins. These would include at least a driver pin, a control pin and a bottom pin. If the lock is master keyed, the bottom pin would be further subdivided into two or more pins. At a minimum then, at least eighteen pins are utilized, and when master keying is done, which is the normal case for these locks since they are utilized in institutional type buildings or the like, it is not uncommon to have up to two dozen individual pins incorporated into the pin-tumbler lock cylinder. All of the pins utilized have the same diameter. However, when four or five pins are utilized in a particular pin-tumbler, as for instance when utilizing master keying, certain of the individual pins are extremely thin and difficult to manipulate.

Prior to cutting a new control key, every one of the pins comprising each of the pin-tumbler must be measured with a micrometer to determine their thickness. Once the thickness is determined it must be recorded such that upon completion of this task, the locksmith then knows the sizes of each of the pins in each of the pin tumblers and can utilize this information to prepare either a new control key or to rekey the lock. During the disassembly of the pin-tumbler lock cylinder, it is sometimes very easy to mix up the pins. Further, during "micing" of the pine, especially the very thin pins, it is easy to drop the same or make measurement errors.

In order to correctly cut a new control key, the location and size of each of the pins in every one of the pin-tumblers must be known. Having labored to pick and remove the pin-tumbler lock cylinder, if a mistake is inadvertently made in disassembly, measurement or recording of the individual pins, all is for naught, and the locksmith in order to cut a control key must start over again and remove a second lock cylinder must again pick that lock cylinder.

BRIEF DESCRIPTION OF THE INVENTION

In view of the above it is obvious for the type of pin-tumbler lock cylinders described, there exists a need for both an apparatus and process for easily and conveniently determining the cuts necessary to prepare a new control key for extraction and insertion of pin-tumbler lock cylinders of the type described. It is therefore a broad object of this invention to fulfill this need. It is a further object of this invention to provide an apparatus and process which is simple in design and operation such that the cuts necessary for a new control key can be easily and speedily determined. It is a further object of this invention to provide an apparatus for use in combination with a pin-tumbler lock cylinder of the type described which, because of the engineering principles incorporated therein is extremely accurate in use, yet would be reasonably available to those who practice the locksmith arts.

These and other objects as will become evident from the remainder of this specification are achieved in combination with a pin-tumbler lock cylinder of the type having a key plug nested within a control cylinder which in turn is nested within a main body cylinder and including at least one bore extending radially through said key plug, said control cylinder and said main body cylinder: a pin-tumbler located in said bore, said pin-tumbler composed of a plurality of pins; said key plug rotatable in said control cylinder utilizing a first key and the combination of said key plug and said control cylinder rotatable in said main body cylinder utilizing a control key: a device for determining the pin-tumbler size for said control key which comprises: a body; said body including a cylinder mating face, said cylinder mating face sized and shaped to intimately fit against the outside surface of said main body cylinder immediately adjacent said bore; a probe means located on said body in association with and extending away from said mating face, said probe means being elongated and having an end, said probe means of a cross sectional dimension smaller than the cross sectional dimension of said bore, said probe means for fitting into said bore and contacting said pin-tumbler located therein with said end of said probe means.

Further, these and other objects will also be achieved in a process of keying a control key for a pin-tumbler lock cylinder of the type having a key plug nested within a control cylinder which in turn is nested within a main cylinder and including at least one bore extending radially through said key plug, said control cylinder and said cylinder body; a pin tumbler located in said bore, said pin-tumbler composed of a plurality of pins including at least a drive pin, a control pin and a further pin: said key plug rotatable in said control cylinder utilizing a first key and said combination of said key plug and said control cylinder rotatable in said main body cylinder utilizing a control key; locating a shim along the shear line between said control cylinder and said main cylinder so as to isolate said driver pin from said control pin and said further pin and to locate said control pin and said further pin in the portion of said bore located in said key plug and said control cylinder; inserting a probe into said bore; contacting said probe against said at least said further pin and said control pin so as to bottom said control pin against said shim; measuring the length of said probe which is located within said bore when said control pin is bottomed against said shim; coordinating the length of said probe with a cut in said control key.

In a first embodiment of the invention, an apparatus is provided which utilizes a probe member slidably mounted to a body so as to move inwardly and outwardly from the mating face. The probe member is connected to an indicator which is capable of giving a readout of the length of the probe member which extends beyond the mating face and thus a measurement of the cut necessary to prepare a new control key.

In a further embodiment of the invention, an apparatus is provided which utilizes a set of probes of different but known sizes, each of which extends a known distance from a mating face with which it is associated. The individual probes are utilized to determine which corresponds to the particular combination of pins forming the pin-tumbler so as to indicate the cut necessary for a control key for the particular pin-tumbler.

In each of the embodiments described above, the probe is inserted through the portion of said bores below the keyway up through said keyway and into the portion of the bores utilized to contain the pin-tumblers.

Normally, in the type of pin-tumbler lock cylinders described, the portion of the bore below the keyway formed in the main body cylinder and in the control cylinder are of a smaller dimension than the remainder of the bore above the keyway wherein the pin-tumblers are located. The bore through these areas is extended below the keyway in order to serve as a drainage hole for draining of any excess lubricant, water or other material which finds its way into the bores or the keyway. Generally, these areas of the bore are circular and of a smaller cross sectional area than the portion of the bore wherein the pin-tumblers are located.

When the control cylinder is in an unlocked position with respect to the main cylinder body, the control pin in each of the bores is held at the shear line between the control cylinder and the main cylinder body because of the misalignment of the bore passing through these two components at this time. However, the portions of the bore below the keyway in the main cylinder body and the control cylinder do not line up because of their circular nature. If one or the other of these were elongated, an opening would line up and appropriate measurements for cutting a new control key could be made. In view, however, of the construction of commercial locks wherein the above noted portions of the bore located below the keyway in both the control cylinder and the main cylinder body are circular, it is necessary to position the control cylinder in the locked position with respect to the main cylinder body and to insert a shim at the shear line between these two in order to bottom out the control pin such that an appropriate measurement can be made to cut a new control key.

BRIEF DESCRIPTION OF THE DRAWINGS

This invention will be better understood when taken in conjunction with the drawings wherein:

FIG. 2 is an exploded view showing certain portions of the lock cylinder of FIG. 1 in top plan view in FIG. 2a, elevational view in FIG. 2b and bottom plan view in FIG. 2c;

FIG. 5 is an elevational view of a first embodiment of the apparatus of this invention;

FIG. 6 is an elevational view similar to FIG. 5 except certain overlaying components have been removed to show underlying components;

FIG. 7 is an isometric view showing use of the device of FIG. 5 in conjunction with the lock of FIG. 1 as well as additionally, the use of a shim; and FIG. 8 is an elevational view of an alternate embodiment of this invention.

This invention utilizes certain principles and/or concepts as are set forth in the claims appended to this specification. Those skilled in the locksmithing arts will realize that these principles and/or concepts are capable of being utilized in a variety of embodiments which may differ from the exact embodiments utilized for illustrative purposes herein. For this reason, this invention is not to be construed as being limited only to the illustrative embodiment but is only to be construed in view of the claims.

DETAILED DESCRIPTION OF THE INVENTION

In FIGS. 1 through 4, a commercial pin-tumbler lock cylinder 10 is shown. The lock cylinder 10 does not form a part of this invention. However, in order to understand the invention, an understanding of its structure and operation is necessary. The lock cylinder 10 can be any one of a number of commercial brands which are available in the marketplace. While these have minor differences between them, for the most part they function in a similar manner.

The lock cylinder 10 utilizes six individual pin-tumblers for its operation. Insofar as each of the pin-tumblers and other parts associated with them are the same, or nearly the same, like numerals will be utilized for like parts.

Figure 1:
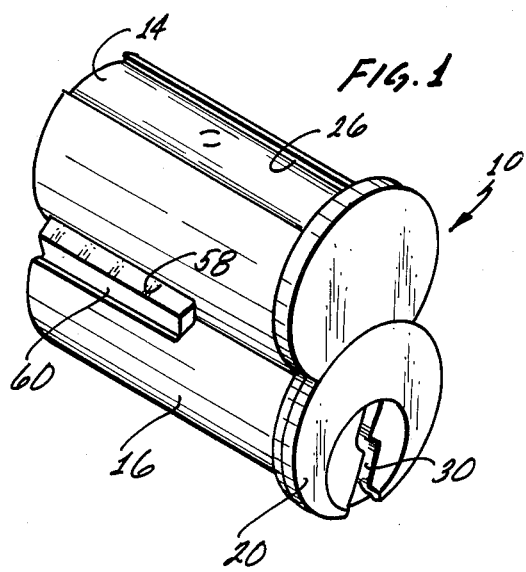
FIG. 1 is an isometric view of a know pin-tumbler lock cylinder which, while not forming a portion of this invention, is necessary to the understanding of the invention.

FIG. 1 shows the pin-tumbler lock cylinder 10 as it would appear when it was completely assembled. In FIG. 2 a clip ring 12 which is seen in FIG. 7 has been removed. Additionally, a slide member 14 is also removed and not shown. The individual pin-tumblers discussed below further have been removed and are not shown in this Fig. What remains in FIG. 2 is the main cylinder body 16 shown in the center of the Fig., the control cylinder 18 shown on the left of the Fig. and the key plug 20 shown on the right. The control cylinder 18 slides into the back side of the main cylinder body 16 and the key plug 20 slides into the front side of the control cylinder 18. This nests the key plug 20 within the interior of the control cylinder 18 and nests both the key plug 20 and the control cylinder 18 within the main cylinder body 16. Once so assembled, the totality of these three parts are held together by the clip ring 12 which fits into the groove 22 on the back end of the key plug 20. The clip ring 12 is of a sufficient size so as to retain both the key plug 20 and the control cylinder 18 in the main cylinder body 16.

Looking at the top view, FIG. 2a, it can be seen that six pin bores, collectively identified by the numeral 24, extend through main cylinder body 16, the control cylinder 18 and the key plug 20. The top of the pin bores 24 open up into a depressed area 26 on the top surface of the main cylinder body 16. The sides of this area 26 are undercut such that the slide member 14 can be slid within the depressed area 26 to retain the pin-tumblers within the lock cylinder 10. The slide member 14 includes a small dimple 28 which fits into the top of one of the pin bores 24 to maintain the slide member 14 locked in position on the main cylinder body 16.

Within the key plug 20 the pin bores 24 open into the keyway 30. The keyway 30 receives any one of a number of keys utilized in conjunction with the pin-tumbler lock cylinder 10. These include a control key, a master key and a change key with the change key individualized for the pin-tumblers of a particular lock cylinder 10 to open only that particular cylinder lock. Both the control key and the master key can open a group of these lock cylinders. The keyway 30 of course can assume any one of a number of shapes allowing for different shaped keys as is the standard in the lock industry. In any event, within the keyway 30, at a point noted by the numeral 32 in FIG. 3, the pin bores 24 taper down to a smaller diameter. This serves to limit the downward movement of the pin-tumblers within the pin bores 24. The keyway 30 extends down through the bottom of the keyway 30 and opens as an elongated slot 34 as seen in the right hand side of FIG. 2c.

The pin bore 24 could be construed as terminating at the point 32. However, an opening or bore continues through the keyway 30 and further through the bottom surfaces of both the control cylinder 18 and the main cylinder 16. These further smaller openings, collectively identified by the numeral 36, in both the main cylinder body 16 and the control cylinder 18 are located directly below the pin bore 24 and serve to discharge excess lubricant, water or other material which may be introduced into either the pin bores 24 or the keyway 30. For the purposes of interpretation of this specification and the claims appended hereto, it will be considered that the openings 36 form a portion of a continuous bore passing radially through the bottom surface of the main body 16, the bottom surface of the control cylinder 18, up through the keyway 30 in the key plug 20 and then through the pin bore 24 formed in the key plug 20, the control cylinder 18 and finally the top of the main cylinder body 16. In FIG. 2a it can be seen that when pin-tumblers are not located within the pin bores 24, that a bore extends completely through all of the components 16, 18, and 20 to form a continuous opening through these components.

Figure 4:
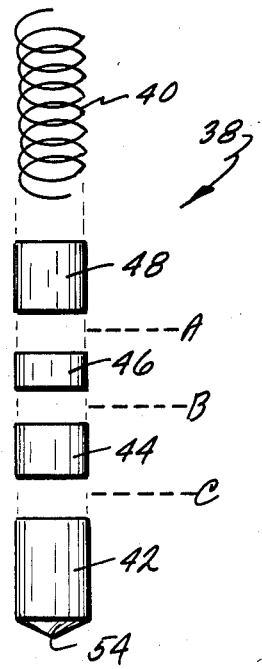
FIG. 4 is an exploded view of pins which together comprise a typical pin-tumbler for use with the lock cylinder of FIG. 1.
Figure 3:
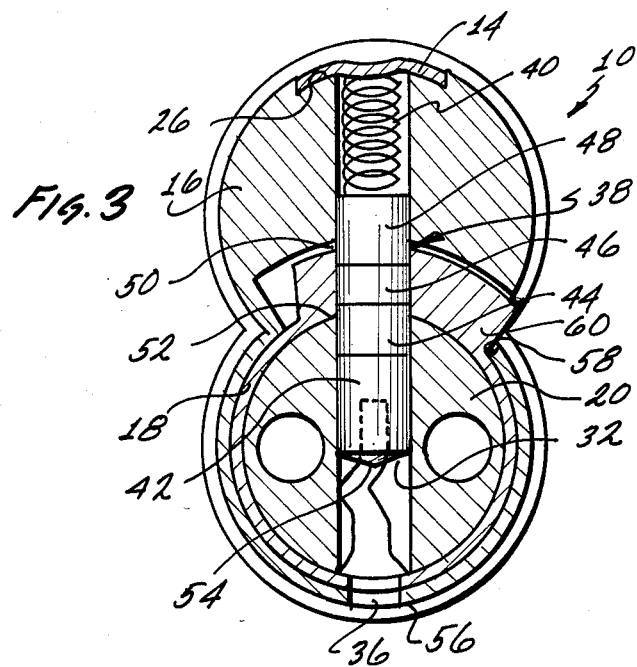
FIG. 3 is a rear elevational view in section about the line 3—3 of FIG. 1.

Referring now to FIG. 4, a representative pin-tumbler 38 is shown. Also shown with it is a spring 40. The pin-tumbler 38 includes a bottom pin 42, a master pin 44, a control pin 46 and a drive pin 48. When the pin-tumbler 38 is located within a pin bore 24 the spring 40 is positioned between the drive pin 48 and the slide member 14 so as to bias the totality of the pin-tumbler 38 downward until the bottom of the bottom pin 42 rests at the point 32 within the pin bore 24. In FIG. 3 a representative pin-tumbler 38 is shown within a representative pin bore 24 in the pin-tumbler lock cylinder 10. It can be seen that the spring 40 has biased the pin-tumbler 38 downward within the pin bore 24. A shear line 50 is located between the control cylinder 18 and the main cylinder 16 and a second shear line 52 is located between the key plug 20 and the control cylinder 18.

In FIG. 3, the control pin 46 is located across the shear line 52 and as such would prevent rotation of the key plug 20 within the control cylinder 18. The drive pin 48 is positioned across the shear line 50 and as such would further prevent rotation of the control cylinder 18 within the main cylinder body 16. By insertion of an appropriate key within the keyway 30 the pin-tumbler 38 would be lifted. If the control key was being used, pin-tumbler 38 would be lifted in an amount to exactly position the interface between the control pin 46 and the drive pin 48 at the shear line 50. This would allow rotation of the control cylinder 18 within the main body cylinder 16. This is utilized to remove and insert the pin-tumbler lock cylinder 10 within an appropriate cylinder lock not separately numbered or shown. If a master key were inserted into the keyway 30, the cut in the master key associated with the pin-tumbler 38 shown in FIG. 3 would raise the pin-tumbler 38 such that the interface between the master pin 44 and the control pin 46 would be located at the shear line 50. This would allow rotation of the key plug within the control cylinder 18. If the change key which is individualized for the particular pin lock cylinder 10 were inserted in the keyway 30, it would position the interface between the bottom pin 42 and the master pin 44 at the shear line 52, also to allow rotation of the key plug 20 within the control cylinder 18.

It is evident that when the interface between the control pin 46 and the drive pin 48 is located at the shear line 50, the lowermost end 54 of the bottom pin 42 would be positioned at a fixed distance from the outside bottom surface 56 which surrounds the opening 36 in the main cylinder body 16. If this measurement were known, it would then be possible to make a cut in a control key which would exactly position the interface between the control pin 46 and the drive pin 48 at the shear line 50 allowing for, at least with respect to the one pin-tumbler 38 and pin bore 24 illustrated in FIG. 3, rotation of the control cylinder 18 within the main cylinder body 16.

As seen in FIG. 2b, the main cylinder body 16 includes a cutout area 58 which accepts a raised shoulder 60 formed on the control cylinder 18. The shoulder 60 projects out of the cutout area 58 in order to "lock" the pin tumbler lock cylinder 10 within an appropriate cylinder lock. When the control key is used within the pin-tumbler lock cylinder 10, it appropriately positions the interface between the respective control pins 46 and drive pins 48 for each of the respective pin-tumblers 38 utilized in the lock cylinder 10 at the shear line 50 such that the control cylinder 18 can be rotated within the main cylinder body 16.

As is seen in FIGS. 1 and 3, when the control cylinder 18 is in the "locked" position with respect to the main cylinder 16 there is a continuous opening or bore passing through the lock cylinder 10 from the bottom surface 56 to the slide member 14.

When the control cylinder 18 is rotated clockwise as seen in FIG. 1 or counterclockwise as seen in FIG. 3, it positions the shoulder 60 within the cutout area 58, retracting the shoulder 60 to an "unlocked" position such that the pin-tumbler lock cylinder 10 can be withdrawn from the appropriate cylinder lock for rekeying or the like. As a result of this, the portion of the pin bore 24 located within the key plug 20 and the control cylinder 18 is misaligned with that portion located within the main cylinder body 16 and the openings 36 in the control cylinder 18 are misaligned with the opening 36 in the main cylinder body 16.

It is evident that instead of having a circular opening 36 in either one or the other of the main cylinder body 16 or the control cylinder 16, but instead having an elongated opening, the position of the control cylinder 18 within the main cylinder body 16 would not matter and there would be a passageway up through the opening 36 into the keyway 30 and the portion of the pin bore 24 located within the control cylinder 18 and the key plug 16. However, since circular openings 36 are utilized, as hereinafter explained, a shim 62, seen in FIG. 7, can be positioned at the shear line 50 to maintain the interface between the control pin 46 and the drive pin 48 positioned at the shear line 50 irrespective of the position of the control cylinder 18 within the main cylinder body 16.

Having reviewed the anatomy and the operation of the pin-tumbler lock cylinder 10 reference is now made to FIGS. 5, 6 and 7. In these Figs., a first embodiment of a measuring device 64 is shown. The measuring device 64 is utilized to ascertain the distance between the outside bottom surface 56 and the lowermost end 54 of the pin-tumbler 38 in order to make an appropriate cut in a control key such that when the control key is inserted into the pin-tumbler lock cylinder 10 the interface between the control pin 46 and the drive pin 48 will be positioned at the shear line 50.

The device 64 has a body 66 which includes a dial face 68 mounted on its front surface. The dial face 68, in conjunction with a dial 70 form an indicator means for readout of the measuring device 64. Printed on the dial face 68 is a plurality of indicia, collectively identified by the numeral 72, to which the dial 70 points in order to obtain a readout.

The body 66 of the device 64 includes a chamber 74 which is covered by a cover plate 76 utilizing a plurality of screws, collectively identified by the numeral 78. Within the chamber 74 is a sliding element 80 having a gear rack 82 on one side thereof. A probe 84 is attached to the sliding element 80. A spring 86 connects between a screw 88 located within the chamber 74 and a second screw 90 attached to the sliding element 80. This biases the element 80 downwardly so as to extend the probe 84 out of the device 64. A pinion 92 is fixed to a shaft 94, with the pinion 92 meshing with the gear rack 82. As such, as the probe 84 and the sliding element 80 to which it is attached moves traversely within the body 66, the pinion 92 and the shaft 94 rotate. The shaft 94 extends up through the dial face 68 with the dial 70 being attached to the shaft 94 such that the dial 70 rotates in response to rotation of the shaft 94.

A mating element 96 is attached to the bottom of the body 66. The mating element 96 includes an opening 98 through which the probe 84 passes. The mating element 96 includes a mating face 100 which is dimensioned in a curve to match the outside surface of the main cylinder body 16 located at the outside bottom surface 56 of this component. This allows for an intimate mating between the mating face 100 and the bottom of the main cylinder body 16.

As seen in FIG. 7, the measuring device 64 is mated against the bottom of the main cylinder body 16 of the pin-tumbler lock cylinder 10 by inserting the probe 84 into one of the openings 36 and passing the probe 84 up into the pin bore 24. When the probe 84 contacts the pin-tumblers 38 located therein, the probe 84 is pushed back into the body 66 of the device 64 causing the dial 70 to rotate. The amount of travel of the probe 84 into the body 66 of the device 64 is indicated by the location of the dial 70 with respect to the indicia 72.

To use the device 64, the pin-tumbler lock cylinder 10 is extracted from the cylinder lock by appropriately picking the lock. Once the pin-tumbler lock cylinder 10 is removed from the cylinder lock, it is inverted and a shim 62 is placed along the shear line 50. By depressing, in turn, the pin-tumblers 38 in each of the pin bores 24 with the probe 84, it is quite easy to position the interface between the control pin 46 and the drive pin 48 for each of the pin-tumblers 38 at the interface 50 such that the shim 62 can be progressively be inserted down the shear line 50 until all six of the pin-tumblers 38 have been positioned with their drive pin on one side of the shim 62 and their control pin 46 on the other side of the shim 62.

Once this is done, then the probe 84 is introduced into each of the openings 36 then into the pin bores 24 until the mating face 100 of the measuring device 64 is snugly against the outside surface of the main cylinder body 16. Because of the bias introduced to the probe 84 via the spring 86, this bottoms out the control pin 46 against the shim 62 and once the control pin 46 is bottomed against the shim 62 further movement of the control pin 46, master pin 44 if used, and bottom pin 42 is halted and the probe 84 is pushed into the body 66 of the device 64, rotating the dial 70. The dial 70 comes to rest adjacent to one of the indicia 72 to correctly read out the appropriate depth of cut necessary to be made in a control key in order for the interface of the control pin 46 and the drive pin 48 of a particular pin-tumbler 38 to be positioned right at the shear line 50.

As sold, cylinder locks which incorporate pin-tumbler lock cylinders such as the lock cylinder 10 described in this specification, utilize pins of standard dimensions. Normally, ten different sizes of pins are used with the individual pins differing from one another by about 0.015 inches in length. Because of this, it is very easy to correlate positioning of the indicia 72 on the dial 68 to correctly indicate what particular cut must be made in a control key in order to position the interface between the control pin 46 and the drive pin 48 at the shear line 50. In taking this measurement, it is not necessary to disassemble the pin-tumbler lock cylinder 10 and instead of trying to "mic" individual pins, especially master pins 44 which may be extremely thin, only one measurement need be made for each of the pin-tumblers 38. As such, for the pin-tumbler cylinder lock 10 shown in the Figs. which utilizes six pin-tumblers 38, only six measurements need be made. These can be made extremely rapidly and accurately by simply inserting the probe 84 of the device 64 into the individual openings leading to the pin bores 24 and reading the position of the dial 70.

Since the pin-tumblers 38 are not removed from the pin-tumbler lock cylinder 10, there is no opportunity whatsoever to drop the same and lose them, or to inadvertently mix up the pins as they are discharged from the pin bores 24, as is necessary if "micing" of the pins is done.

It is further evident from FIG. 7 that if the clip ring 12 is removed, the shim 62 can be placed along the shear line 52 and measurements could be made of the cuts necessary for either a new master key or a new change key for the particular pin-tumbler lock cylinder 10. Normally, in setting up a pin-tumbler lock cylinder 10 and others like it to be master keyed, master pins 44 are only utilized in two or three of the particular pin-tumblers 38. These are normally placed in the pin bores 24 near the back end of the pin tumbler lock cylinder 10. Knowing this, the master locksmith can utilize the device 64 not only to prepare control keys but also to prepare master keys and change keys.

Shown in FIG. 8 is an alternate embodiment of the device 64. In this embodiment, a plurality of individual measuring device 102 are utilized. Normally, ten of these devices would be utilized with the probe 104 on each of these devices sized to one of the distances indicated by each of the individual indicia 72 of the device 64. Each of the devices 102 would include a mating face 106 which would serve the same purpose as the mating face 100 on the device 64. The probes 104 would be inserted, starting with the longest probe, one at a time, into the openings 36 leading to the pin bores 24. When a probe of the proper length is selected which would just position the mating face 106 against the bottom side of the main cylinder body 16, the locksmith would know the cut to make in the control key in order to position the interface between the control pin 46 and the drive pin 48 at the shear line 50 of the pin-tumbler lock cylinder 10. As with the other device 64, a shim 62 would be utilized to fix each of the pin-tumblers 38 of the particular lock cylinder 10 such that their interface between their control pins 46 and their drive pins 48 were at the shear line 50.

The measuring devices 102 could include an opening 108 which would allow attachment of a plurality of these devices together to form a convenient measuring tool. While the device 64 is more sophisticated and would be the faster to use, the measuring devices 102, because of the simplicity of construction, could be very economically available to a locksmith.

For both the devices 64 and 102, preferredly the respective mating faces 100 and 106 would be arcuate in shape to exactly match the outside contours of the main cylinder body 16 in order to ensure more accurate positioning of their respective probes 84 and 104. The probes 84 and 104 would be of a diameter slightly smaller than the openings 36 in order to allow for insertion of the probes 84 and 104 into these openings. It is preferrable, however, not to undersize the diameter of the probes 84 and 104 too much below the size of these openings 36 in order to assure appropriate abutting of, for instance, the end 110 of probe 84 against the lowermost end 54 of the drive pin of any of the pin tumblers 38. The arcuate nature of the mating faces 100 or 106 further insures accurate positioning of the end 110 of the probe against the end 54 of the pin-tumbler.

I claim:

1. In combination with a pin-tumbler lock cylinder of the type having a key plug nested within a control cylinder which, in turn, is nested within a main body cylinder and including at least one bore extending radially through said key plug, said control cylinder and said main body cylinder: a pin-tumbler located in said bore, said pin-tumbler composed of a plurality of pins; said key plug rotatable in said control cylinder utilizing a first key and the combination of said key plug and said control cylinder rotatable in said main body cylinder utilizing a control key:
    a device for determining the pin-tumbler size for said control key which comprises:
    a body;
    said body including a cylinder mating face, said cylinder mating face arcuately shaped in cross section and sized to intimately fit against the outside surface of said main body cylinder immediately adjacent said bore;
    a probe means located on said body in association with and extending away from said mating face, said probe means being elongated and having an end, said probe means of a cross sectional dimension smaller than the cross sectional dimension of said bore, said probe means for fitting into said bore and contacting said pin-tumbler located therein with said end of said probe means.

2. The combination of claim 1 further in combination with:
    a shim, said shim sized and shaped so as to fit along the shear line between said control cylinder and said main cylinder.

3. The combination of claim 1 further including:
    dimension means for indicating the dimension between the end of said probe means and said mating face when said probe means is located in said bore and is in contact with said pin-tumbler.

4. The combination of claim 1 including:

a plurality of said bodies, each of said bodies including a mating face which is arcuate in shape so as to intimately mate against the outside surface of said main cylinder adjacent to said bore;

each of said bodies including a probe extending outwardly from said mating face of said body, each of said probes terminating in an end;

the probes on each of said bodies being of a fixed dimension between said mating face and its end, the probe on each of said bodies being of a dimension different than the probe on any of the other of said bodies so as together said bodies and their respective probes attached thereto formed a dimensioned set of a variety of sizes corresponding to sizes for different pins comprising said pin-tumbler.

5. The combination of claim 3 wherein:

said probe means comprises a probe member movably mounted on said body and located on said body in association with said mating face, said probe member having an end, said end of said probe member moving towards and away from said mating face in response to movement of said probe member with respect to said body;

said dimension means including indicator means located in operative association with said probe member, said indicator means for indicating the distance between said end of said probe member and said mating face.

6. The combination of claim 5 wherein:

said indicator means comprises dial means, said dial means including a plurality of indicia located thereon, said indicia corresponding to discrete distances between the end of said probe member and said mating face.

7. The combination of claim 5 including:

biasing means associated with said probe member, said biasing means for biasing said probe member such that said end of said probe member is moved in a direction away from said mating face.

8. The combination of claim 7 further including:

connecting means, said connecting means operatively associated with said probe member and said indicator means, said connecting means for transferring movement of said probe member to said indicator means.

9. The combination of claim 8 wherein:

said connecting means includes gear means associated between said probe member and said indicator means.

10. The combination of claim 9 wherein:

said indicator means comprises dial means, said dial means including a plurality of indicia located thereon, said indicia corresponding to discrete distances between the end of said probe member and said mating face.

11. A process of keying a control key for a pin-tumbler lock cylinder of the type having a key plug nested within a control cylinder which in turn is nested within a main cylinder and including at least one bore extending radially through said key plug, said control cylinder and said cylinder body; a pin tumbler located in said bore, said pin-tumbler composed of a plurality of pins including at least a drive pin, a control pin and a further pin; said key plug rotatable in said control cylinder utilizing a first key and said combination of said key plug and said control cylinder rotatable in said main body cylinder utilizing a control key;

locating a shim along the shear line between said control cylinder and said main cylinder so as to isolate said driver pin from said control pin and said further pin and to locate said control pin and said further pin in the portion of said bore located in said key plug and said control cylinder;

inserting a probe into said bore;

contacting said probe against said at least said further pin and said control pin so as to bottom said control pin against said shim;

measuring the length of said probe which is located within said bore when said control pin is bottomed against said shim;

coordinating the length of said probe with a cut in said control key.

12. The process of claim 11 wherein:

said probe comprises one of a set of probes each having a body, a mating face located on said body and a probe member extending from said mating face wherein each of the members of said set of probes has a probe member of a length corresponding to a common cut in a control key.

13. The process of claim 11 wherein:

said probe comprises a device having a body, a mating face located on said body and a probe member movably mounted to said body so as to move on said body;

said probe member including an end, said probe member located on said body such that said end moves away from and toward said mating face;

and further including locating said body with respect to said main cylinder such that said mating face contacts said main cylinder adjacent to said bore whereby said probe member is inserted into said bore with the end of said probe member contacting said pin-tumbler so as to bottom said control pin against said shim.

* * * * *

UNITED STATES PATENT AND TRADEMARK OFFICE
CERTIFICATE OF CORRECTION

PATENT NO. : 4,570,355

DATED : FEBRUARY 18, 1986

INVENTOR(S) : WILLIAM DeFORREST

It is certified that error appears in the above-identified patent and that said Letters Patent is hereby corrected as shown below:

Column 2, Line 45, "pine" should be --pins--.
Column 4, line 45, "know" should be --known--.
Column 5, line 9, "keyway 30" should be --key plug 30--.
Column 7, line 53, "15" should be --18--.
Column 9, line 57, "device" should be --devices--.
Column 11, line 16, "formed" should be --form--.
Column 12, line 25, second occurrence of "said" should be deleted.

Signed and Sealed this

Seventh Day of October, 1986

[SEAL]

*Attest:*

DONALD J. QUIGG

*Attesting Officer*  *Commissioner of Patents and Trademarks*